(12) United States Patent
Karnofski et al.

(10) Patent No.: US 10,690,123 B2
(45) Date of Patent: Jun. 23, 2020

(54) COOPERATIVE SHAPE MEMORY ALLOY TORQUE TUBES FOR CONTINUOUS-ACTION TURNING MOTOR

(71) Applicant: The Boeing Company, Chicago, IL (US)

(72) Inventors: Kent E. Karnofski, Lake Forest Park, WA (US); Frederick T. Calkins, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 168 days.

(21) Appl. No.: 15/671,554

(22) Filed: Aug. 8, 2017

(65) Prior Publication Data

US 2019/0048860 A1    Feb. 14, 2019

(51) Int. Cl.
| | |
|---|---|
| *F03G 7/06* | (2006.01) |
| *F01D 15/12* | (2006.01) |
| *F16H 29/12* | (2006.01) |
| *C22C 19/03* | (2006.01) |
| *C22C 19/00* | (2006.01) |

(52) U.S. Cl.
CPC ............ *F03G 7/065* (2013.01); *C22C 19/007* (2013.01); *C22C 19/03* (2013.01); *F01D 15/12* (2013.01); *F16H 29/12* (2013.01); *C21D 2201/01* (2013.01); *F05D 2220/323* (2013.01); *F05D 2240/60* (2013.01); *F05D 2300/11* (2013.01); *F05D 2300/142* (2013.01); *F05D 2300/1431* (2013.01); *F05D 2300/1616* (2013.01);
(Continued)

(58) Field of Classification Search
CPC ... F03G 7/065; F03G 7/06; F03G 7/00; H05B 1/0291; H05B 3/0004; F16H 25/14; Y10T 74/18888
See application file for complete search history.

(56) References Cited

U.S. PATENT DOCUMENTS

| 5,127,228 A | * | 7/1992 | Swenson | ................. | F03G 7/065 60/527 |
| 7,037,076 B2 | * | 5/2006 | Jacot | ....................... | F03G 7/065 416/155 |

(Continued)

FOREIGN PATENT DOCUMENTS

| EP | 1997922 | 12/2008 |
| EP | 2305986 | 4/2011 |

(Continued)

OTHER PUBLICATIONS

Extended European Search Report dated Oct. 17, 2018 for EP Application No. 18176425.9.

(Continued)

*Primary Examiner* — Mark A Laurenzi
*Assistant Examiner* — Shafiq Mian
(74) *Attorney, Agent, or Firm* — Gates & Cooper LLP

(57) ABSTRACT

An engine turning "clock work" motor including two shape memory alloy (SMA) torque tube actuators, ratcheting mechanisms, and gearing. The gearing communicates the SMA torque tube actuators with a common gear that applies torque to a shaft, so that while one torque tube is heated and applying torque, the other torque tube is relaxed (using a cooling mechanism). The ratchet prevents the relaxing torque tube from applying torque in the incorrect direction.

19 Claims, 16 Drawing Sheets

(52) U.S. Cl.
CPC .. *F05D 2300/172* (2013.01); *F05D 2300/174* (2013.01); *F05D 2300/177* (2013.01)

(56) References Cited

U.S. PATENT DOCUMENTS

| | | | |
|---|---|---|---|
| 8,820,046 B2 | 9/2014 | Ross et al. | |
| 9,581,146 B2* | 2/2017 | Shome | F03G 7/065 60/524 |
| 9,759,203 B2* | 9/2017 | Brown | F03G 7/06 60/526 |
| 2006/0266031 A1* | 11/2006 | Kosaka | G02B 7/102 60/527 |
| 2010/0219288 A1* | 9/2010 | Larssen | B64C 7/00 60/526 |
| 2010/0303616 A1* | 12/2010 | Chir | F02C 6/08 415/178 |
| 2012/0292155 A1* | 11/2012 | Gunter | F03G 7/065 192/82 T |
| 2015/0101452 A1* | 4/2015 | Martig | F03G 7/065 74/99 R |
| 2016/0169213 A1* | 6/2016 | Calkins | F03G 7/065 60/527 |
| 2016/0348588 A1 | 12/2016 | Ross et al. | |
| 2016/0369784 A1* | 12/2016 | Brown | F03G 7/065 60/528 |
| 2017/0234166 A1* | 8/2017 | Dube | F02C 3/04 60/779 |
| 2017/0240269 A1* | 8/2017 | Cox | B64C 25/405 60/526 |

FOREIGN PATENT DOCUMENTS

| | | |
|---|---|---|
| EP | 3032100 | 6/2016 |
| EP | 3051074 | 8/2016 |
| GB | 1549166 | 7/1979 |
| GB | 1549666 | 7/1979 |
| JP | 61227685 | 10/1986 |

OTHER PUBLICATIONS

Barbuti, A., "Inboard, Electric Skateboard on 'Shark Tank': A Look Inside the Company", Heavy, http://heavy.com/news/2016/12/inboard-electric-skateboard-shark-tank-products-episodes-new-season-8/, as downloaded Apr. 28, 2017, pp. 1-7.

Inboard Technology, https://inboardtechnology.com/blog/, as downloaded Apr. 28, 2017, pp. 1-2.

Wheeler, R.W., et al, "Engineering Design Tools for Shape Memory Alloy Actuators: CASMART Collaborative Best Practices and Case Studies", SMASIS2016-9183, Proceedings of the ASME 2016 Conference on Smart Materials, Adaptive Structures and Intelligent Systems, Sep. 28-30, 2016, Stowe, VT, USA.

Jardine, A. Peter, et al., "Improved Design and Performance of the SMA Torque Tube for the DARPA Smart Wing Program", Part of the SPIE Conference on Industrial and Commercial Applications of Smart Structures Technologies, Newport Beach, XA, Mar. 1999, SPIE vol. 3674, pp. 260269.

* cited by examiner

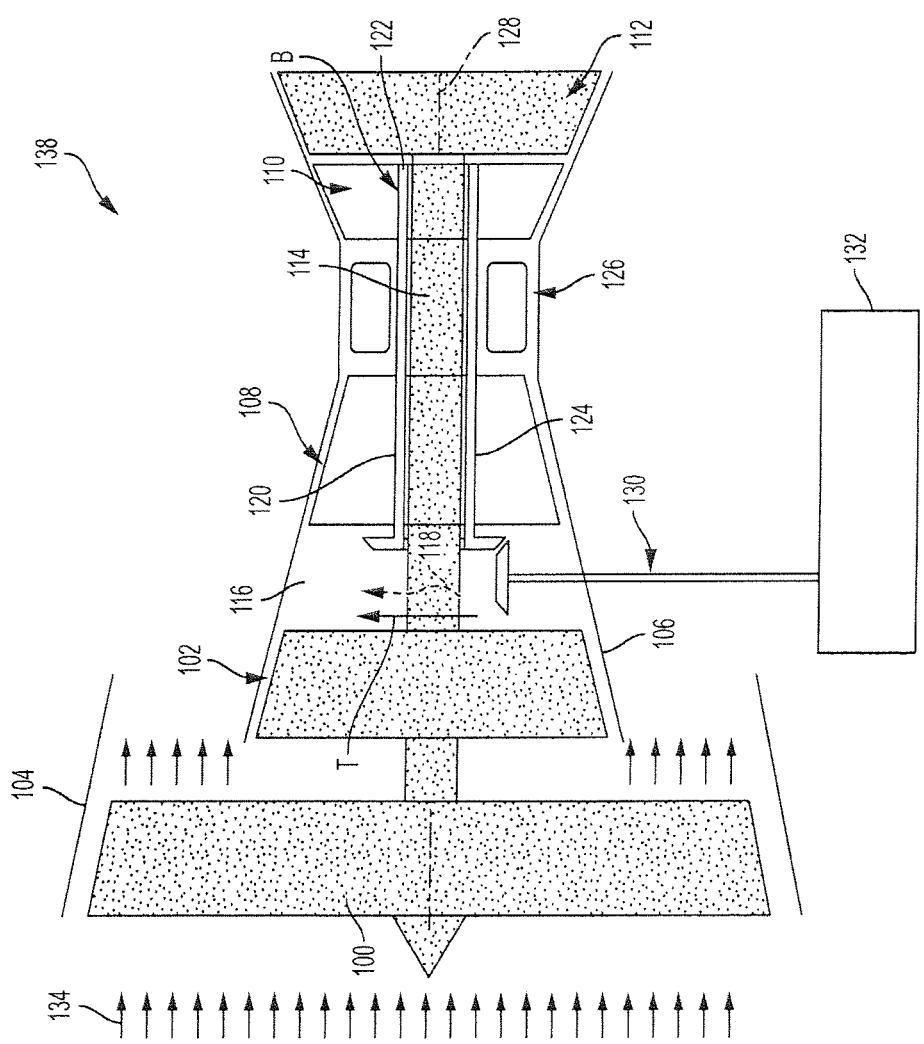

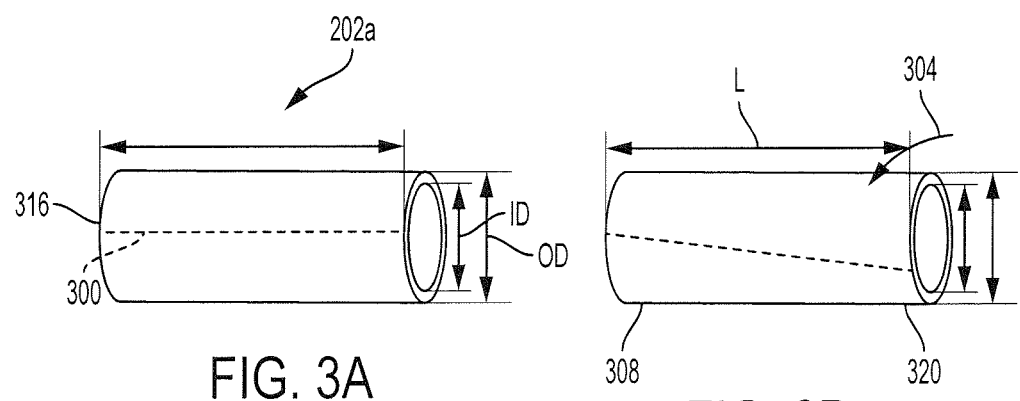
FIG. 3A
FIG. 3B
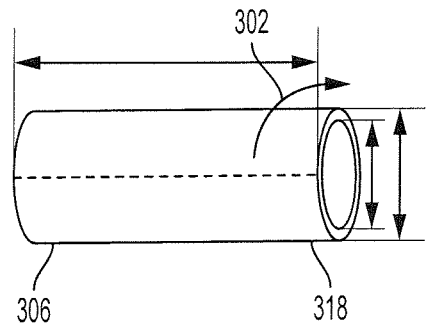
FIG. 3C

COOPERATIVE SHAPE MEMORY ALLOY TORQUE TUBES FOR CONTINUOUS-ACTION TURNING MOTOR

BACKGROUND

1. Field

The present disclosure relates to a system for turning an aircraft gas turbine engine.

2. Description of the Related Art

FIG. 1A illustrates an aircraft engine 138 comprising a fan 100, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. After engine shutdown on the ground, residual hot air 116 in the engine core rises 118 and is trapped by the engine casing 106. As the hot air rises 118, the upper portion 120 of the HP compressor's (engine's rotor) 108 rotor shaft 122 becomes hotter than the lower portion 124 of the rotor shaft 122 and causes uneven cooling and thermal deformation of the engine rotor shaft 122 (i.e., rotor bowing, where the upper portion 120 of the rotor shaft 122 becomes longer than the lower portion 124). Upon engine restart (e.g., prior to fuel ignition in the combustor 126), even tiny fractions of rotor shaft bowing can cause the HP compressor (engine's rotor) 108 to rub against the engine's casing 106. The rub causes vibrations (manifested as disconcerting noise in the aircraft cabin) or even damage to the aircraft (e.g., engine damage, damage to the engine case lining, damage to the air pre-cooler used by the environmental control system, or damage to other accessories). Also illustrated are the rotor shaft's 122 longitudinal axis 128, transmission 130 connecting a gearbox 132 to the rotor shaft 122, and air 134 inputted into the engine during operation. FIG. 1B illustrates that on an aircraft 136, the engine 138 is housed in a nacelle 140. The nacelle 140 may also trap rising 118 hot air 116 that causes a temperature gradient T.

One method to mitigate these problems is to build the engine with wider cold build clearances ("opened up" clearances), so that the compressor rotor shaft 122 can bow without causing blades to rub on the engine casing 106. However, more advanced engine designs prefer less "gap" between the engine casing and the compressor rotors (tighter "cold build clearances") to reduce air leakage and improve thrust specific fuel consumption (TSFC). Thus, the overriding need to reduce fuel consumption renders wider cold build clearances less desirable. Indeed, as ever tighter cold build clearances are implemented, the problems caused by engine rub will become more severe.

Conceivably, an engine architecture could add rotor stiffening or bearing arrangements to reduce the amount of rotor shaft bow that is physically possible. However, these architecture changes would add weight and manufacturing cost to the engine.

Other methods of mitigating rotor shaft bow comprise rotating the shaft (1) so that the shaft cools uniformly, returns to thermal equilibrium, and straightens, and/or (2) so that centrifugal forces straighten the bow. The shaft rotation is achieved (1) by motoring the engine at relatively low revolutions per minute (RPM) after starting the engine (but before running the engine at high RPM) and/or (2) using an Engine Turning Motor (ETM) to turn the rotor shaft when the engine is off.

However, conventional methods for providing power to the ETM or the engine so as to straighten the bow can be problematic. Some smaller aircraft, such as the Boeing 737 airplane, fly into remote airports where facility power is not available to power the ETM or engine. Furthermore, auxiliary power unit (APU) power on the aircraft is not always available to power the engine or ETM because some airports limit APU use at gates due to emissions and noise concerns and aircraft are not powered when they are towed between gates. In addition, airplanes may operate with a nonfunctional APU or the powering of the ETM or engine may cause undesirable APU wear (extended motoring prolongs the APU's exposure to main engine start (MES) mode, reducing APU life). Finally, the use of lithium-ion and nickel-cadmium batteries for powering the ETM is problematic due to high failure rates and flammability concerns associated with the engine environment (extreme heat, extreme cold, and high vibration).

Moreover, rotating the shaft shortly before departure causes departure delays, especially if reduced engine clearances require turning the rotor at low speeds. These delays not only inconvenience the passengers but also increase costs associated with increased waiting times and parking fees.

What is needed then, is a more efficient method for mitigating rotor shaft bowing that simplifies ground logistics. The present disclosure satisfies this need.

SUMMARY

The present disclosure describes a motor comprising cooperatively connected torque tubes each fabricated from a shape memory alloy (SMA). The cooperatively connected torque tubes generate a continuous torque output when the torque tubes sequentially change shape in response to heat.

Examples of the SMA composition include, but are not limited to, nickel and titanium (NiTi), nickel (Ni), titanium (Ti), and hafnium (Hf), or NiTi further including at least one metal selected from Copper, (Cu), Iron (Fe), Platinum (Pt), and Palladium (Pd). Examples of the Hf content in the NiTiHf include, but are not limited to, a Hf content in a range of 10%-30%. Other SMA examples include, but are not limited to, alloys of zinc, copper, gold and iron, e.g., iron-based SMAs (such as Fe—Mn—Si) and copper-based SMAs (such Cu—Zn—Al, Cu—Al—Ni).

A controller activates a heater so as to sequentially heat the torque tubes. In various examples, the cooperatively connected torque tubes comprise a pair of the torque tubes connected to gearing, wherein the gearing transfers torque from each torque tube sequentially so as to generate the continuous torque output. The gearing alternately transfers the torque from one of the torque tubes to an output shaft when the other of the torque tubes is cooling. The torque from each of torque tubes turns the output shaft in the same direction.

In one or more examples, each of the torque tubes untwist so as to generate the torque in response to the heat that transforms the SMA into an austenitic phase. In one example, the heater comprises a coil of wire about one end of each of the torque tubes, so as to provide the heat through induction when a current (I) is passed through the wire. After providing the torque, the torque tubes then twist in response to cooling from a cooling system that transforms the SMA into a martensitic phase.

Illustrative embodiments described herein use a ratcheting mechanism connected to the end of each torque tube so that each of the torque tubes untwist continuously in a first direction in response to the heat.

In one or more embodiments, the torque tubes are each trained to output torque capable of turning a rotor shaft in a gas turbine engine. As described herein, trapped air in the casing surrounding the rotor shaft creates a temperature gradient perpendicular to a longitudinal axis of the rotor shaft. However, when the cooperative torque tubes are connected to the rotor shaft, the torque generated by the torque tubes is capable of turning the rotor shaft about the longitudinal axis so as to reduce or prevent thermal bowing of a rotor shaft in the temperature gradient. In various examples, the motor including the torque tubes is attached to an aircraft engine gearbox.

BRIEF DESCRIPTION OF THE DRAWINGS

Referring now to the drawings in which like reference numbers represent corresponding parts throughout:

FIG. 1A is a schematic illustration of a gas turbine engine.

FIGS. 3A-3E illustrate the shape memory effect.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

TECHNICAL DESCRIPTION

Example Apparatus

Figure 1B:
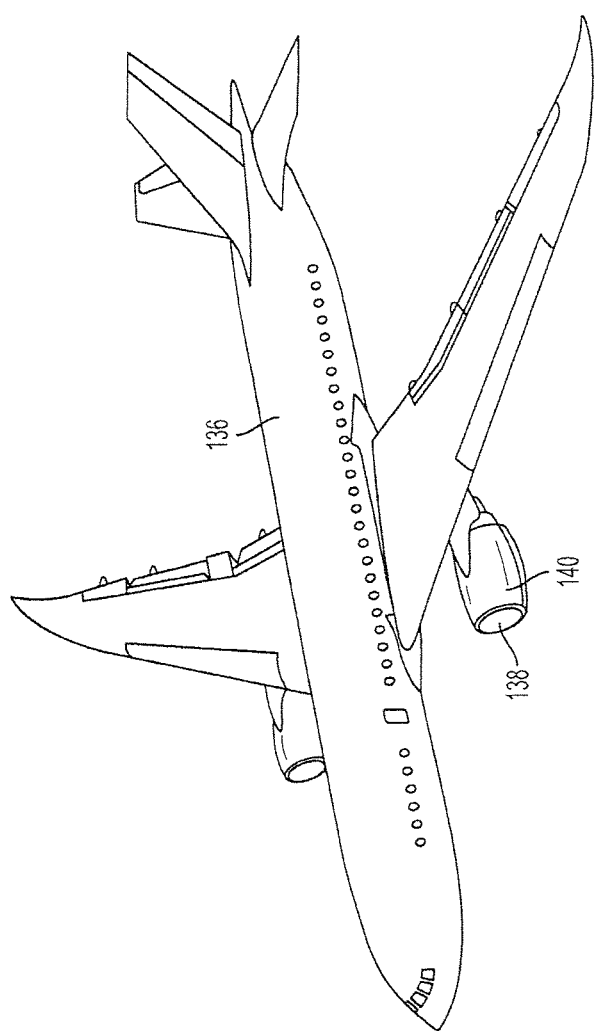
FIG. 1B illustrates the gas turbine engine mounted in a nacelle on an aircraft.
Figure 2:
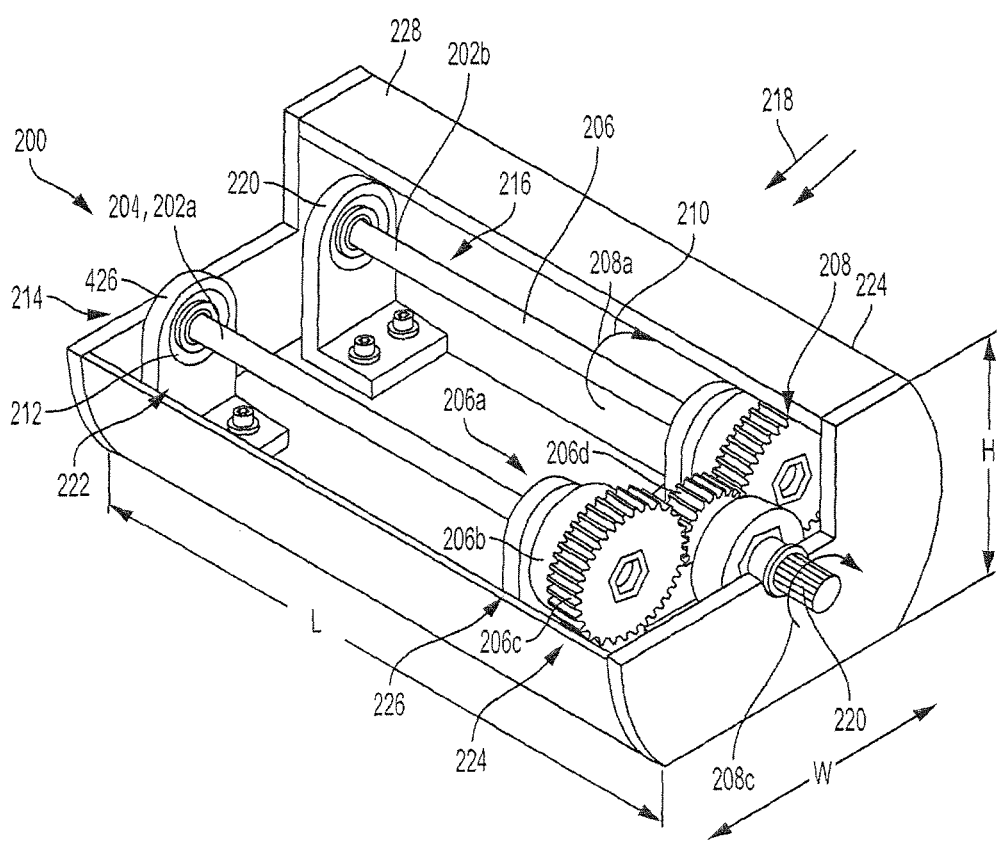
FIG. 2 illustrates a motor comprising a pair of torque tubes each comprising an SMA.

FIG. 2 illustrates a motor (200) comprising cooperatively connected torque tubes (202a), (202b) each comprising a shape memory alloy (204). The cooperatively connected torque tubes (202a), (202b) comprise a pair of the torque tubes (202a, 202b) connected to gearing (206). The gearing (206a) includes sprag gears (206a), each comprising a sprag clutch (206b) connected to a gear (206c), and an output/common gear (206d) engaging the gear (206c). The gearing (206) transfers torque (208a), (208b) from each torque tube (202a, 202b) sequentially so as to generate a torque output (208c), and so that the torque (208a), (208b) from each of the torque tubes (202a, 202b) is in the same direction (210). A ratcheting mechanism (212) is connected to the end (214) of each of the torque tubes (202a, 202b) in order to control the motion of the torque tubes (202a), (202b).

In one or more embodiments, the cooperatively connected torque tubes (202a), (202b) generate the torque output (208c) that is continuous (e.g., without interruption in time) when the torque tubes (202a), (202b) sequentially change shape (216) in response to heat (218) and the torque output (208c) transitions from comprising the torque (208a) provided by one torque tube (202a) to comprising the torque (208b) provided the other torque tube (202b). The gearing (206) transfers the torque output (208c) to an output shaft (220) connected to the gearing (206).

FIGS. 3A, 3B, and 3C illustrate torque tubes (202a), (202b) fabricated from an SMA and having a length L (e.g., in a range of 5-50 inches), an inner diameter (ID) (e.g., in a range of 0.1-2 inches), and an outer diameter (OD) (e.g., in a range of 0.1-2 inches). The dashed line (300) is a guide to the eye indicating how the torque tubes (202a), (202b) change their shape (216), by untwisting (302) in response to the heat (218) that transforms the SMA into an austenitic phase (306) (FIG. 3C) or by twisting (304) in response to the cooling (312) that transforms the SMA into a martensitic phase (308) (FIG. 3B).

Figure 3D:
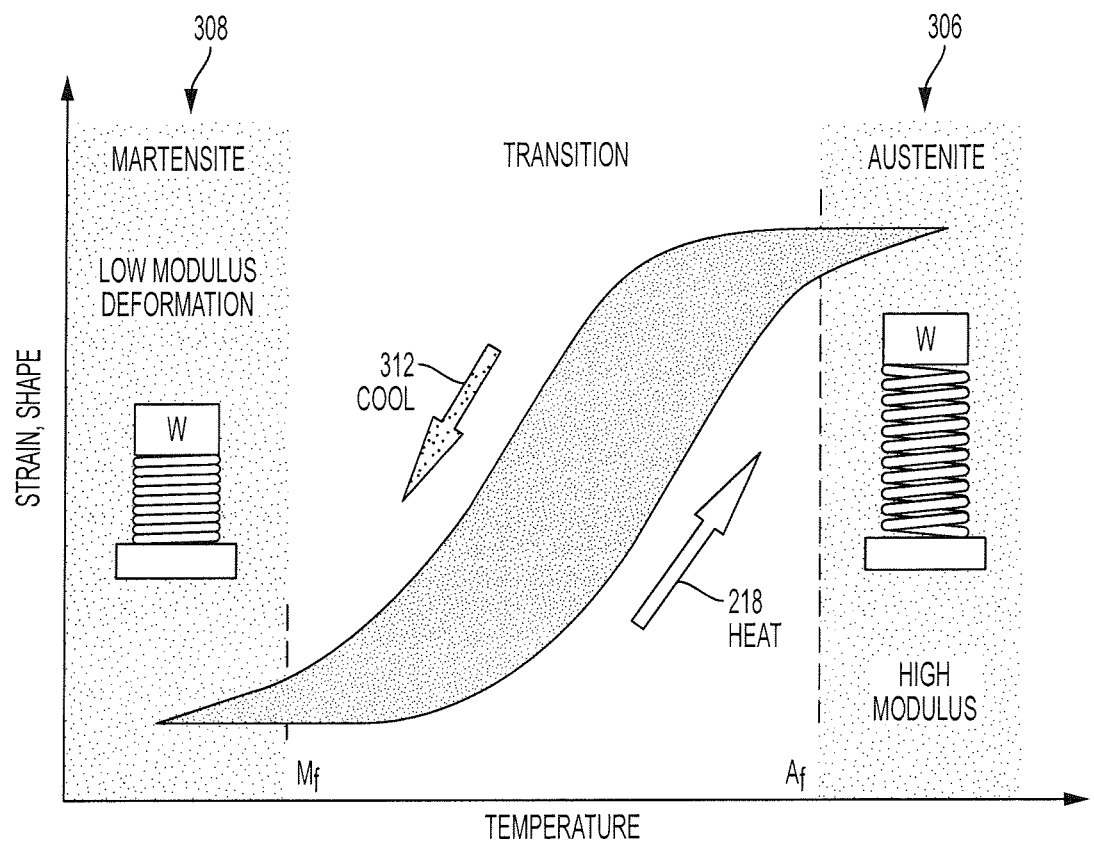

FIG. 3D illustrates the shape memory effect is thermally activated, the SMA having a martensitic phase (308) (characterized by low modulus deformation) at a first temperature ($M_f$) and the austenite phase (306) (characterized by high modulus deformation) at a second temperature $A_f$. FIG. 3D further illustrates the lower modulus deformation in the martensitic phase (308) is characterized by a weight (W) deforming the SMA by a greater amount in the martensitic phase (308) than in the austenite phase (306) (the SMA spring 322 is engineered to expand when heated to undergo the austenitic transformation).

Figure 3E:
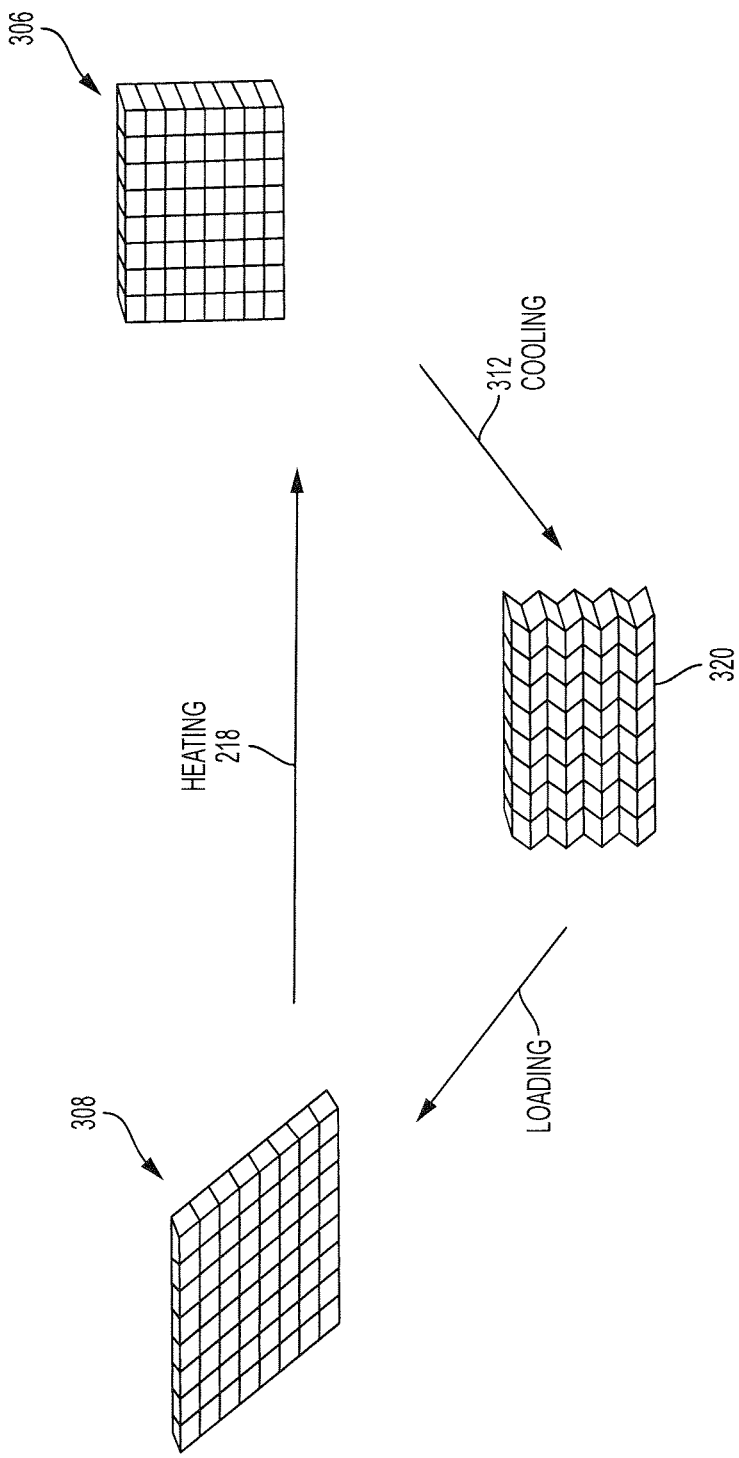

FIG. 3E illustrates that in some embodiments, thermal activation causes a microstructural phase change that produces a shape change (216) under load (i.e., cooling (312) cools the SMA into a twinned martensitic phase (320); when the SMA is connected to a load, the SMA transforms into its detwinned martensitic phase (308) which creates large motion change.

Figure 4A:
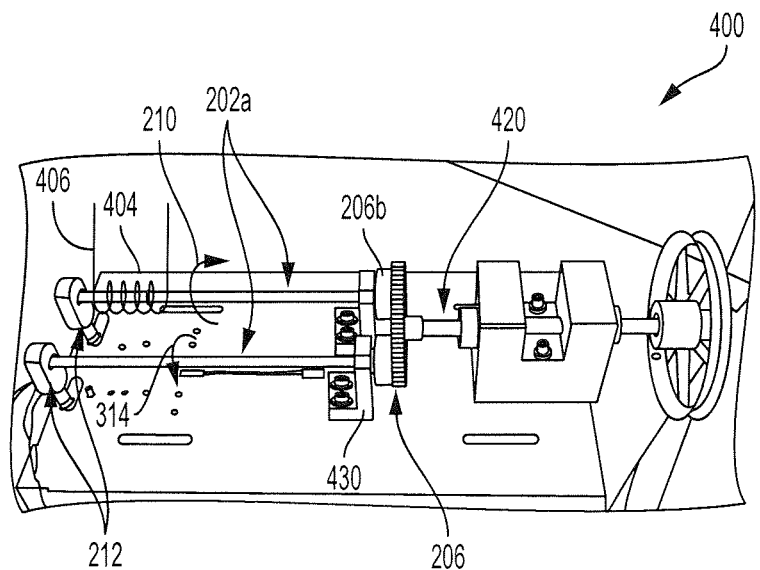
FIGS. 4A-4C illustrates an embodiment wherein the motor comprising the pair of torque tubes is coupled to a heater.
Figure 4B:
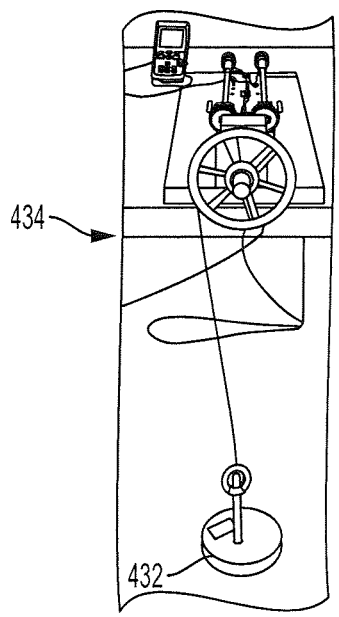
Figure 4C:
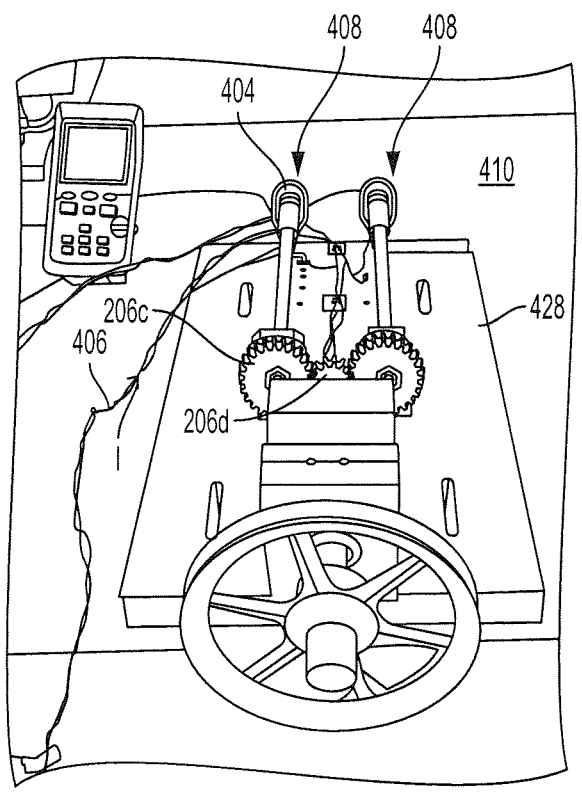

FIGS. 4A-4C illustrates an actual implementation of a motor (400) comprising a heater (402) coupled to the torque tubes (202a), (202b). The heater (402) comprises a coil (404) of wire (406) about one end (408) of each of the torque tubes (202a, 202b), so as to provide the heat (218) through induction when a current (I) is passed through the wire (406). However, other heating systems (e.g., waste heat harvesting systems) as known in the art may also be used. Passive air cooling (410) provides the cooling (312) to each of the torque tubes (202a, 202b) as described herein. The ratcheting mechanism (212) connected to the end (214) of each of the torque tubes (202a, 202b) allows the torque tubes (202) to untwist (302) continuously in a first direction (210) in response to the heat (218).

Figure 4D:
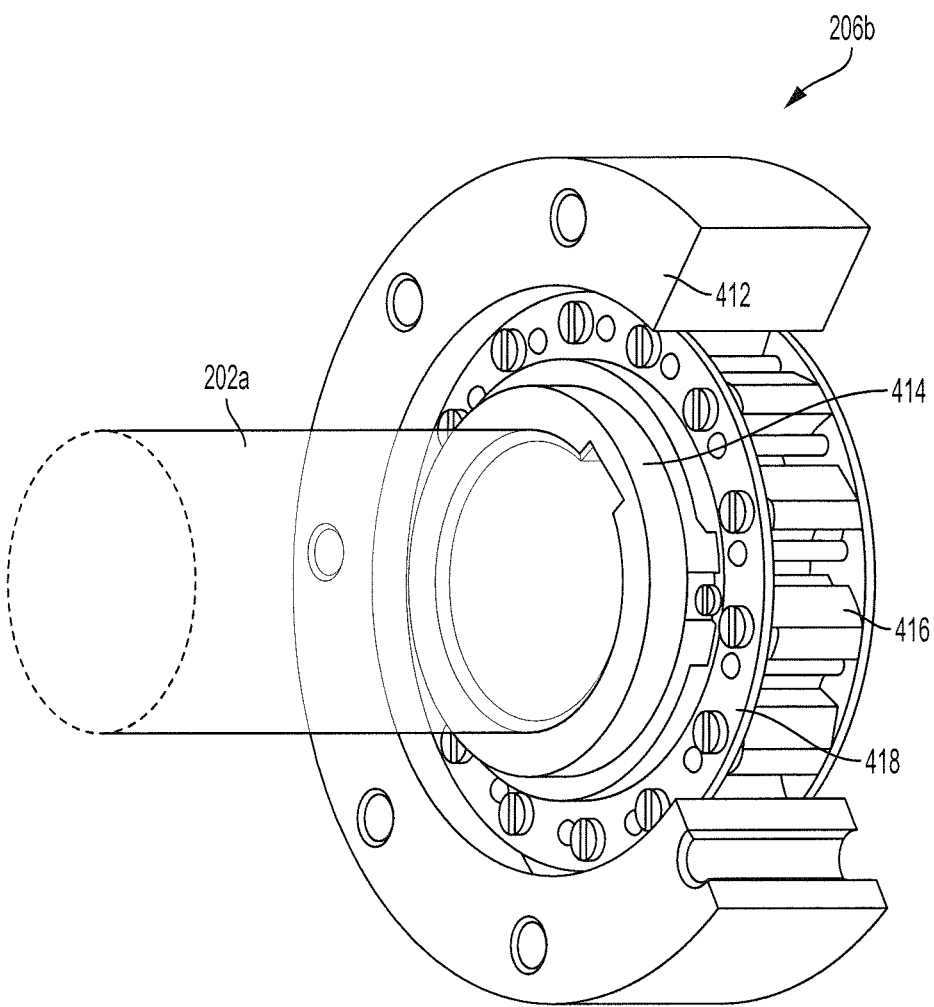
FIG. 4D illustrates a sprag clutch used to engage and disengage the torque tubes to the output shaft in FIG. 2 and FIGS. 4A-4C.

FIG. 4D illustrates a sprag clutch (206b) that is connected to each of the torque tubes (202a), (202b). Each of the sprag clutches (206b) comprise an outer member (412), an inner member (414), sprags (416), and a cage (418). The outer member (412) is attached to the gear (206c) so as to rotate with the gear (206c). The inner member (414) is attached to rotate with the torque tube (202a), (202b). When the torque tube (202a), (202b) generates torque (208a) in response to heat (218) so as to rotate in the first direction (210), rotation of the inner member (414) causes the sprags (416) to engage the outer member (412) so that the torque (208a) is transferred to the gear (206c). The gear (206c) engages output gear (206d) so as to transfer torque (208a) to output shaft (220) connected to output gear (206d). When the torque tube (202a) is cooling (312) and rotates in the second direction (312) opposite the first direction (210), the inner member (414) rotates so that the sprags (416) do not engage the outer member (412). Thus, any torque from the torque tube (202a), (202b) is not transferred to the output shaft (220), (420) and the sprag gear (206a) allows transmission of torque in only one direction.

Figure 4E:
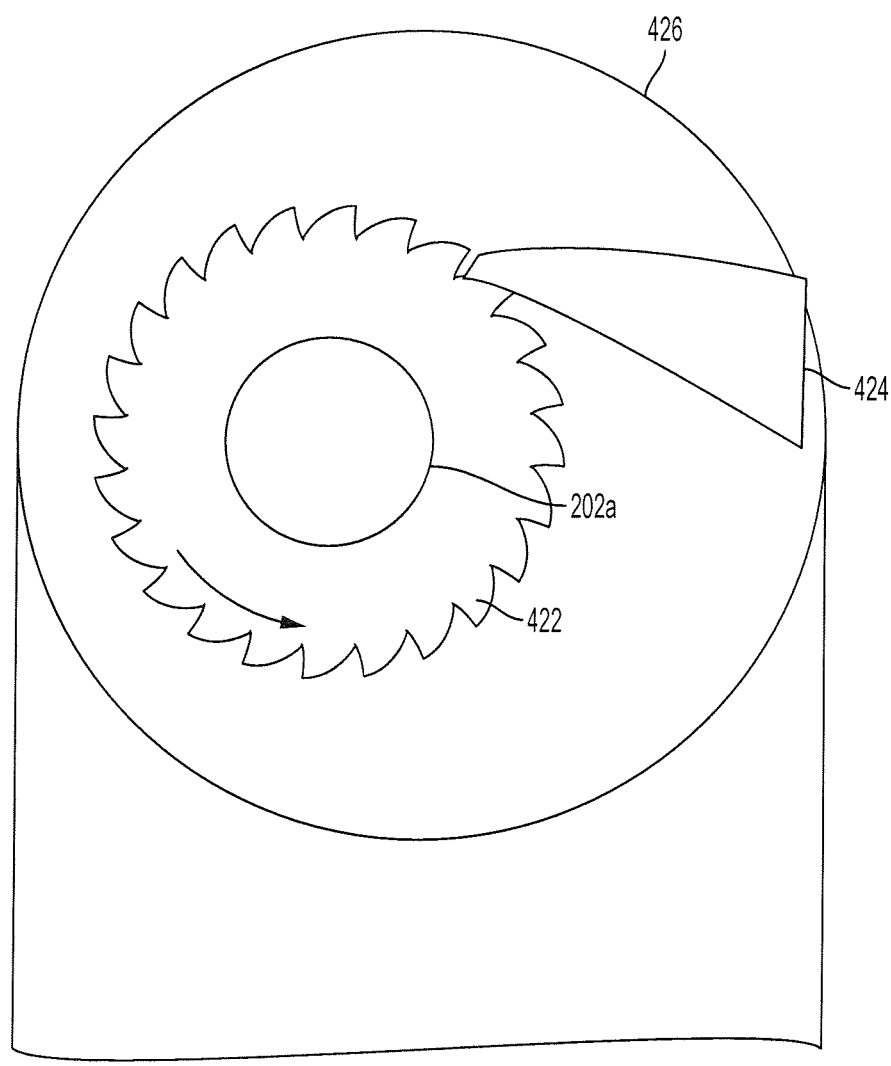
FIG. 4E illustrates a ratcheting mechanism comprising a ratchet and pawl, for use with the torque tubes illustrated in FIG. 2 and FIGS. 4A-4D.

FIG. 4E illustrates the ratcheting mechanism (212) comprises a ratchet wheel (422) operatively coupled to a pawl (424). The ratchet wheel (422) is attached to the torque tube (202a). The pawl (424) is attached to a support or mount (426) fixed to a housing (428) containing the torque tubes (202a), (202b). The torque tubes (202a) and (202b) are attached to the housing (428),(228) via a bearings in a mount (430).

FIGS. 4A-4C further illustrate the output shaft (420) is capable of moving a hanging mass (432) via a pulley system (434). The hanging mass (432) simulates the load being driven by the torque output (208c). During testing, each torque tube (202a), (202b) provided torque (208c) to the output shaft (420) for a half cycle and the output shaft (420) connected to the mass (432) rotated at 1 revolution per minute (RPM).

Example Installation

Figure 5:
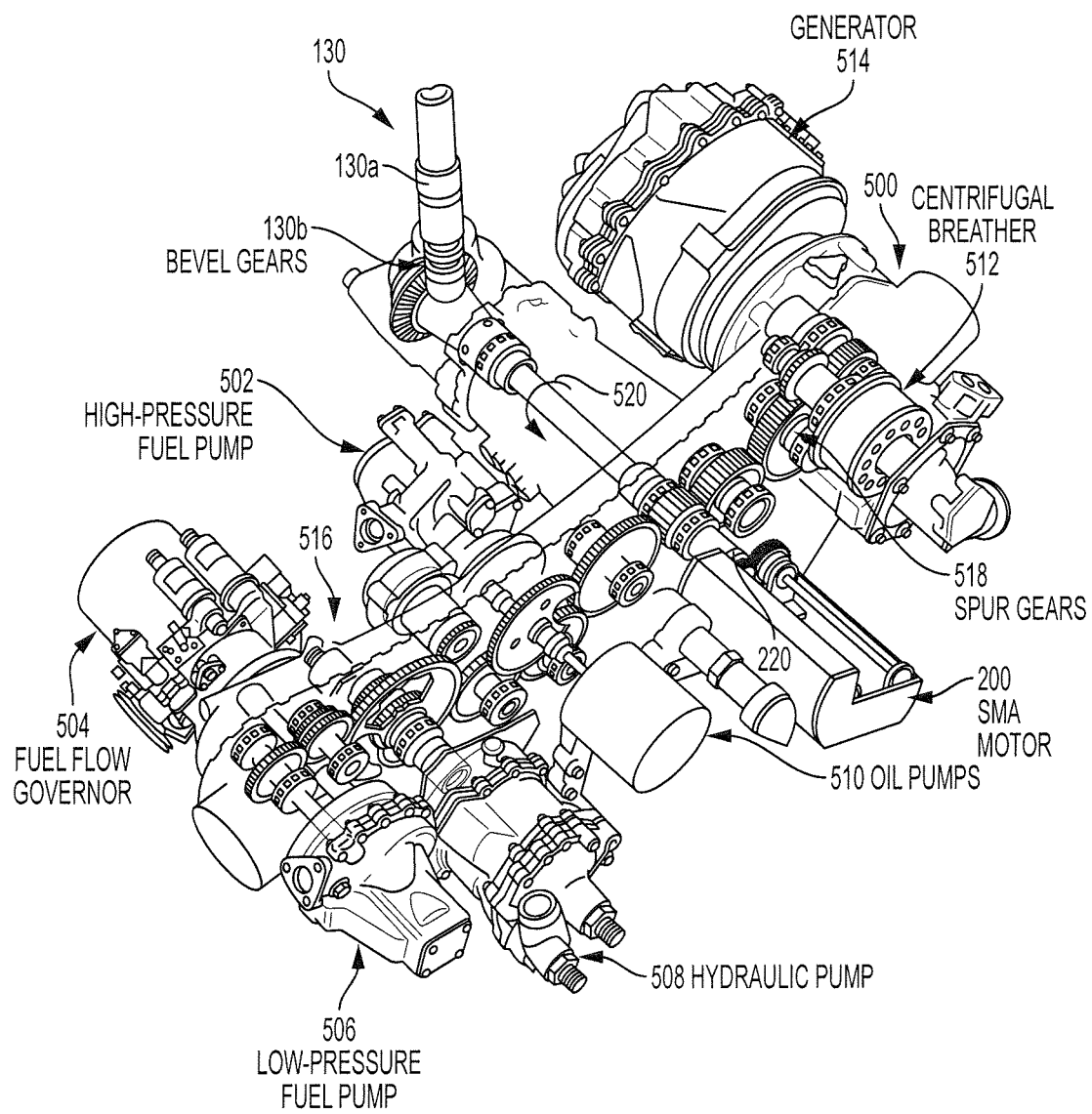
FIG. 5 illustrates an embodiment wherein the motor comprising the torque tubes is attached to an aircraft engine gearbox.

FIG. 5 illustrates the motor (200) comprising the torque tubes (202a), (202b) attached to an aircraft engine gearbox 500. A high pressure fuel pump (502), fuel flow governor (504), low pressure fuel pump (506), hydraulic pump (508), oil pump (510), a centrifugal breather (512), and a generator (514) are also shown attached to pads on a face (516) of the gearbox (500). The gearbox (500) comprises spur gears (518) that transfer torque (520), from the transmission (130) driven by the gas turbine engine (138), to the various accessories (502), (504), (506), (508), (510), (512), and (514) that use the torque (520) to provide energy to perform their function.

When the output shaft (220) engages the transmission (130), the motor (200) drives or turns the rotor shaft (122), e.g., so as to reduce or prevent thermal bowing (B) of the rotor shaft (122) in a temperature gradient (T). In one or more embodiments, the transmission (130) comprises a clutch drivably coupling the output shaft (220) to the transmission shaft (130a).

Example Application

Figure 6:
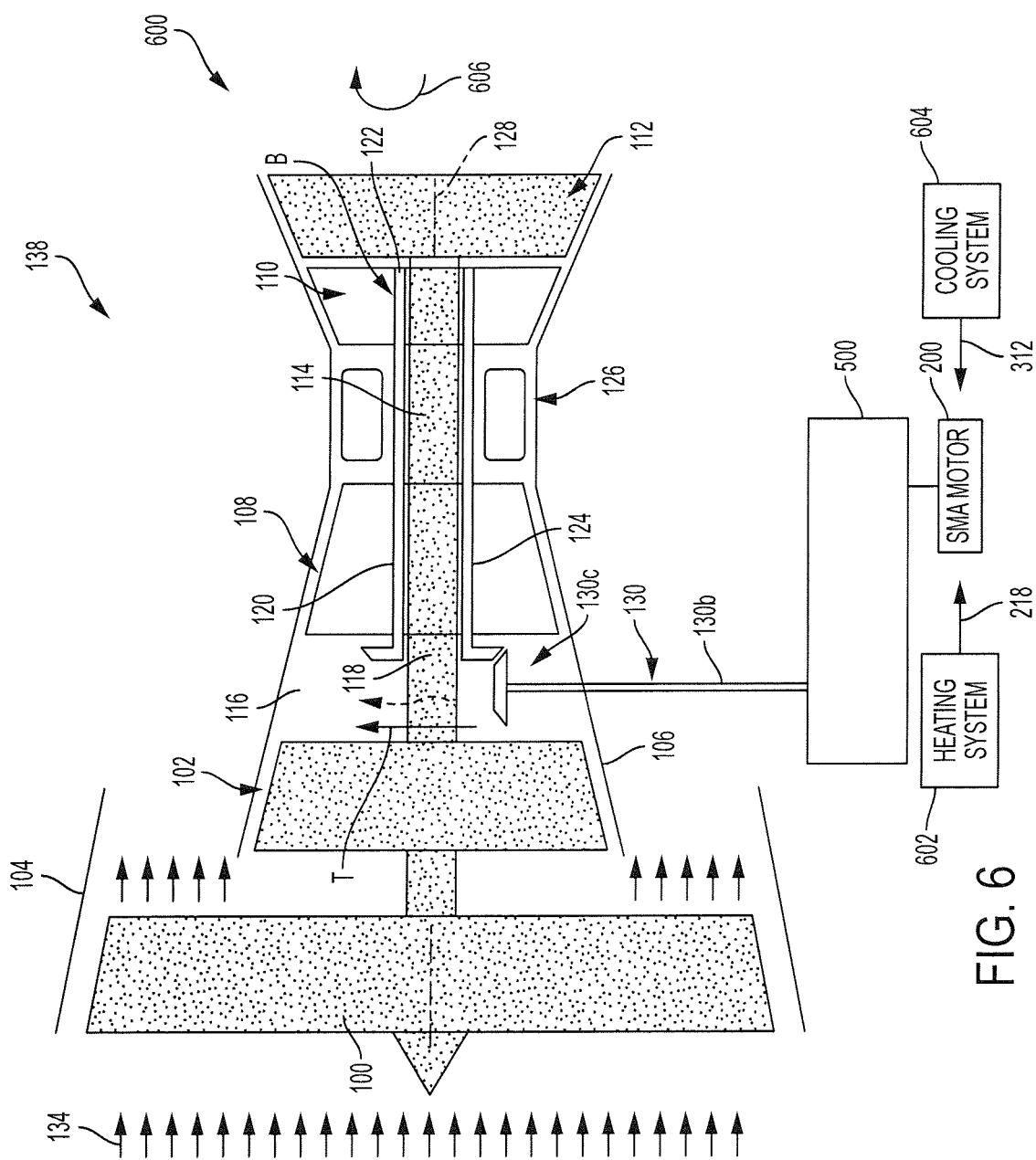
FIG. 6 illustrates an embodiment wherein a gas turbine engine (138) is drivably connected to the motor comprising a torque tube.

FIG. 6 illustrates a system (600) comprising a gas turbine engine (138) connected to the motor (200). The gas turbine engine (138) comprises a rotor shaft (122) having a longitudinal axis (128), wherein the rotor shaft (122) is disposed inside a casing (104, 106, 140). Trapped air (116) inside the casing (104, 106, 140) creates a temperature gradient (T) perpendicular to the longitudinal axis (128). While FIG. 6 illustrates the rotor shaft (122) comprising a HP shaft in a 2 spool engine (138), in other embodiments, the rotor shaft is a LP shaft (114) (e.g., in a 2 spool or 3 spool engine) or an intermediate-pressure shaft in a 3 spool or 2 spool engine. The gearbox may be attached to the fan case (104).

When the motor (200) is activated, the gearing (206) outputs the torque (208c) to the transmission (130) via gearbox (500). The torque (208c) is transmitted to the rotor shaft (122) via the transmission (130) comprising a transmission shaft (130a) and gearing (130b), (130c) connecting the transmission shaft (130b) to the rotor shaft (122).

A controller (1100) activates the heater/heating system (602) so as to sequentially heat (218) the torque tubes (202a, 202b) and the gearing (206) transfers the torque (206a) from one of the torque tubes (202a) when the other of the torque tubes (202b) is cooled (using cooling system (604)). As described herein, the torque tube (202a), (202b) that is cooling (312) is disengaged from the transmission (130).

Thus, the torque (208a), (208b) from each of torque tubes (202a, 202b) turns (606) the rotor shaft (122) in one direction about the longitudinal axis (128) so as to reduce or prevent thermal bowing (B) of the rotor shaft (122) in a temperature gradient (T).

In various embodiments, the motor (200) turns (606) the rotor shaft (122) periodically (i.e. once every 10 minutes, 30 minutes, hour, etc.) over a period of time (e.g., 8 hours) to promote an even temperature profile in the rotor shaft 122. Rotation examples include the motor (200) turning or rotating the rotor shaft (122) a full revolution, a plurality of revolutions, a partial revolution, or in increments. In one example, the motor (200) drives the rotor shaft (122) with a speed and for a duration such that the probability of a compressor rub is less than e-8 per flight-hour (or less than 1 chance in 100 million per flight hour ($1\times10^8$ per flight hour))

Examples of the heater (602) include, but are not limited to, an energy harvester that transfers waste heat from the aircraft or aircraft engine (138) so as to heat the torque tubes (202a), (202b) into the austenitic phase. Examples of the cooler/cooling system (604) include, but are not limited to, a passive cooling system or a system that uses air cooling (e.g., using pressurized air).

Experimental Results

Figure 7:
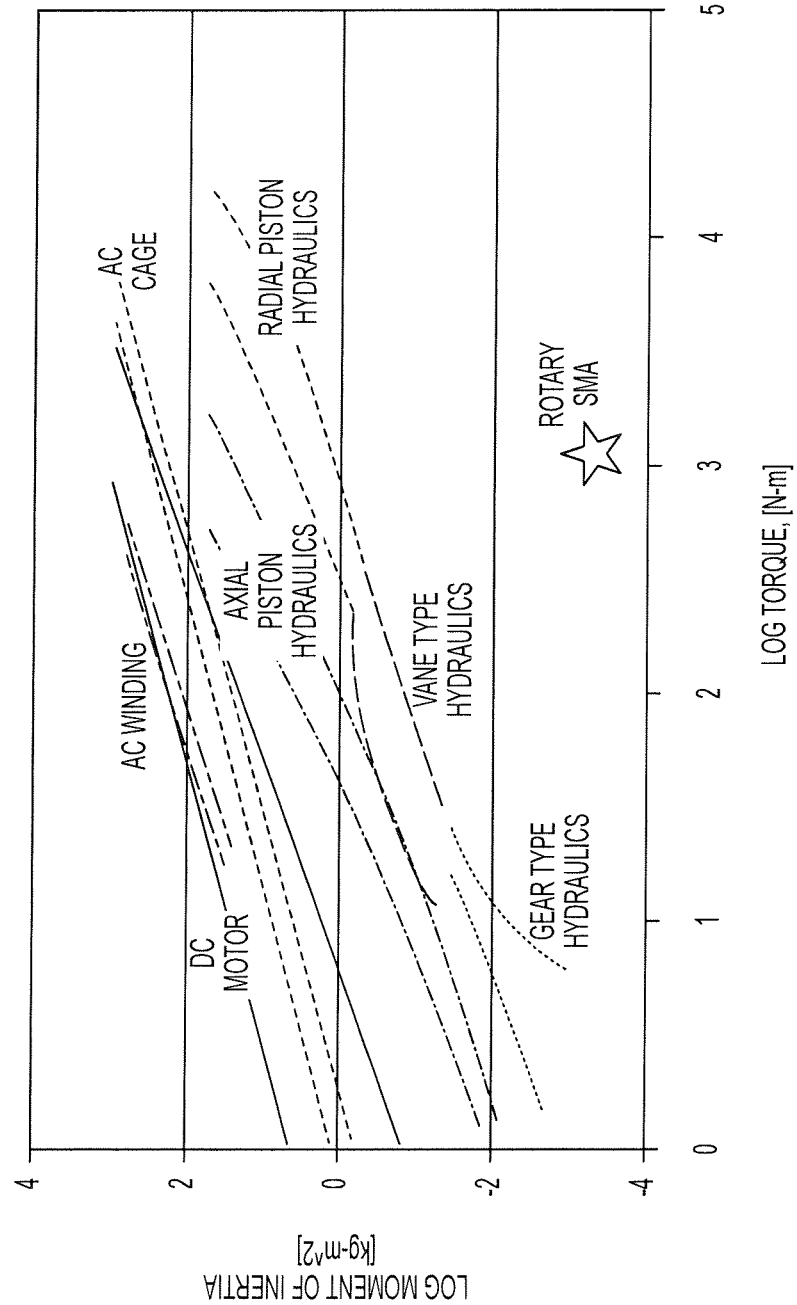
FIGS. 7-9 illustrate experimental results showing characteristics of one or more SMA motor embodiments (wherein in FIG. 9 the different curves represent data taken under different loads (so stress is different in each SMA element and increasing load biases the SMA element and changes the delta between the austenite (hot) and martensite (cold) shapes, as seen as the y axis change as a function of temperature).
Figure 8:
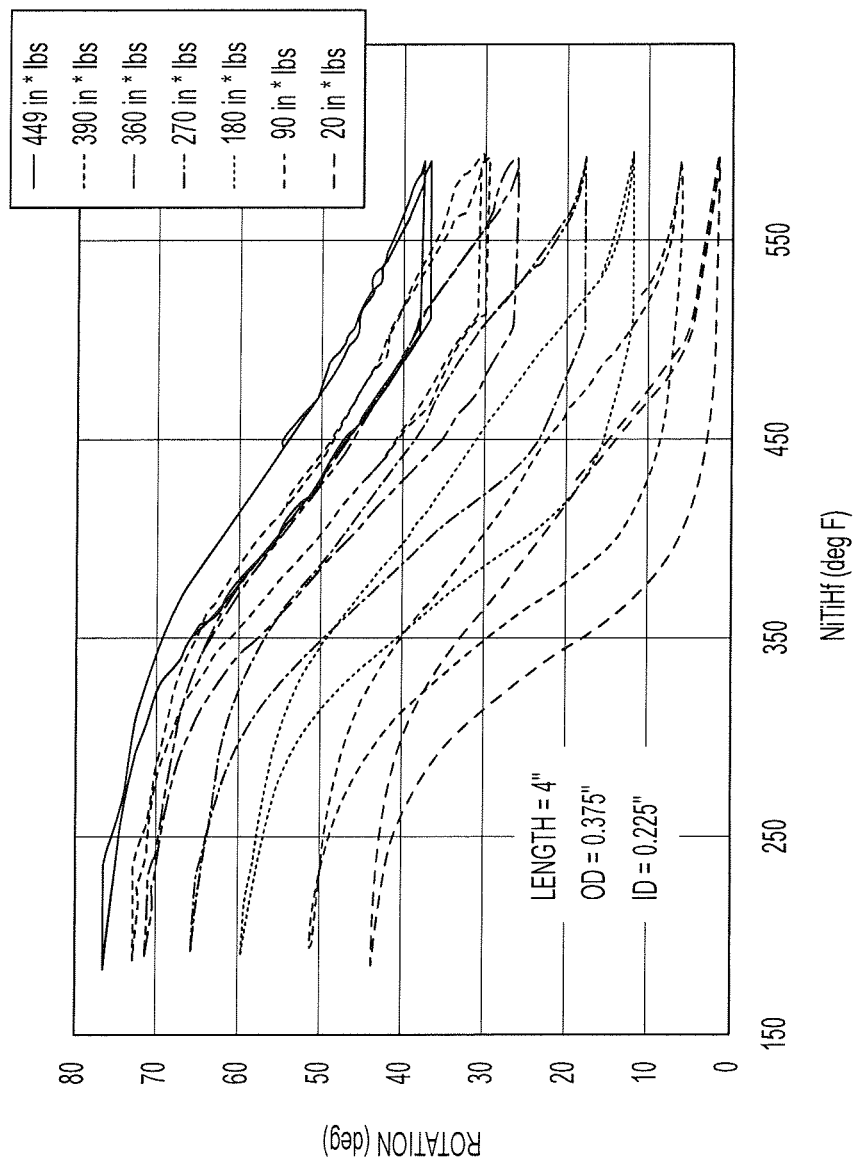
Figure 9:
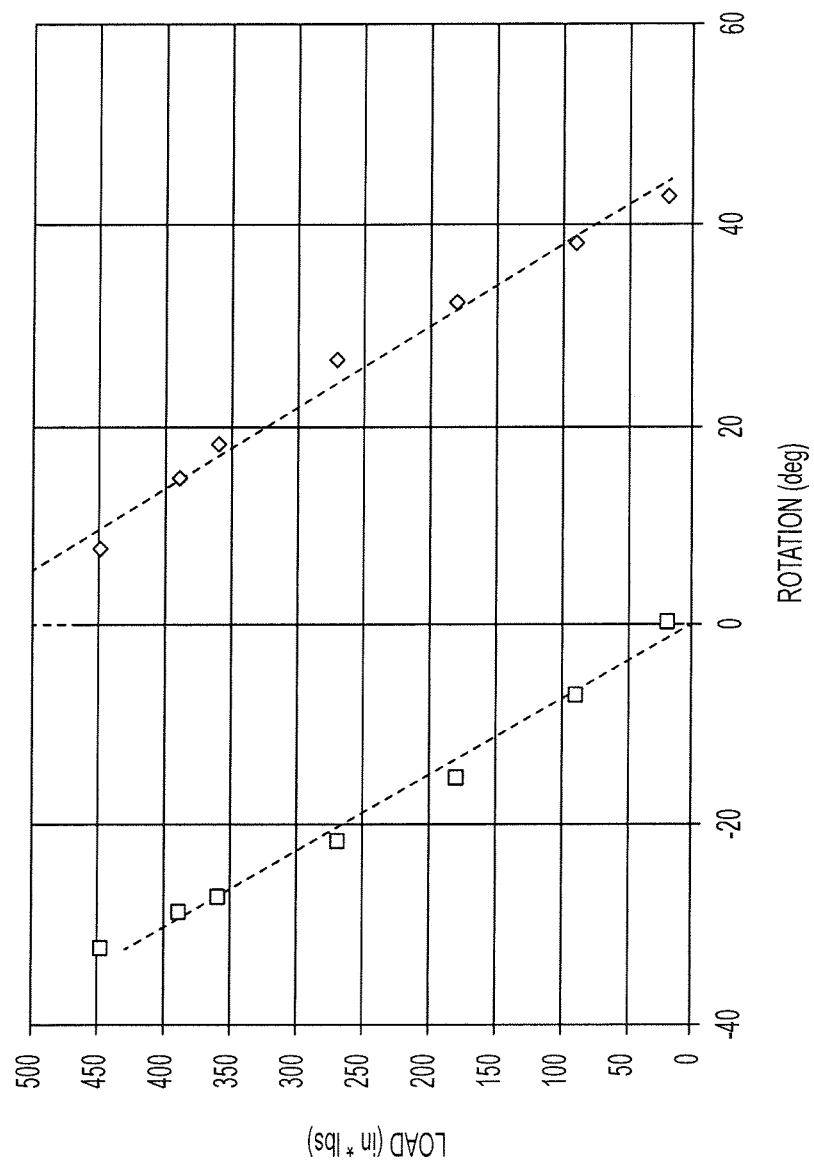

FIGS. 7-9 illustrate experimental results showing characteristics of one or more rotary SMA motor embodiments (200), (400) described herein.

FIG. 7 plots (log moment of inertia) as a function of log (torque).

FIG. 8 plots rotation of a torque tube (202a), (202b) as a function of temperature applied to the torque tube (202a), (202b), wherein the torque tube (202a), (202b) consists essentially of NiTiHf (20% Hf) and has a length=4 inches, an OD=0.375 inches, and an ID=0.225 inches FIG. 9 illustrates the load (inch*lbs) as a function of rotation angle for the torque tube (202a), (202b) measured in FIG. 8.

The results presented herein demonstrate that SMA motors (200), (400) may replace conventional actuation systems such as DC motors.

Process Steps

Figure 10:
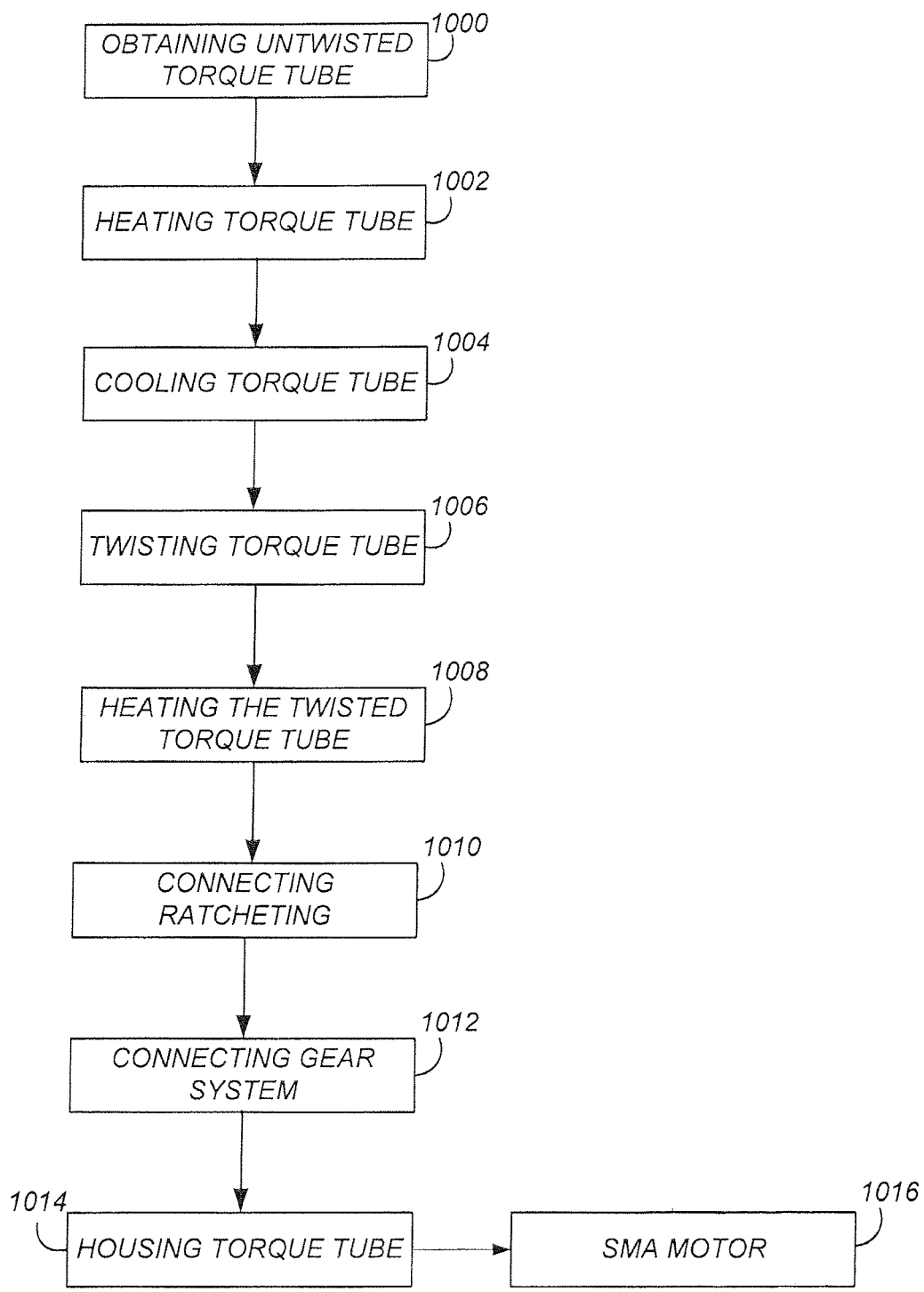
FIG. 10 illustrates a method of fabricating an SMA actuated motor.

FIG. 10 illustrates a method of fabricating one or more torque tubes (202a), (202b) and/or motor (200) comprising the torque tubes. The method comprises the following steps.

Block 1000 represents obtaining an untwisted torque tube (316) comprising or consisting essentially of, an SMA.

Examples of torque tube dimensions include, but are not limited to, a length L in a range of 5-50 inches and a diameter (OD or ID) in a range of 0.1-2 inches.

In one or more embodiments, the SMA comprises or consists essentially of nickel and titanium. In yet further embodiments, the SMA comprises, or consists essentially of, nickel, titanium, and hafnium (NiTiHf). In one example, the Hf content in the NiTiHf is in a range of 10%-50%. In another example, the Hf content in the NiTiHf is in a range of 15%-30%. In yet another example, the NiTiHf contains ~50% Hf, 10%-25% Hf, with Ti making up the remainder.

SMA compositions consisting essentially of NiTi may be particularly suitable for use with heating systems (502) that harvest waste heat energy used to heat the SMA into the austenitic phase (thereby reducing power consumption). SMA compositions consisting essentially of NiTiHf may be particularly suitable for use with passive cooling systems (604) used to cool the SMA into the martensitic phase (SMA's consisting essentially of NiTi may require relatively more complex cooling systems for cooling (312) into the martensitic phase).

Block 1002 represents heating the torque tube (316) so that the SMA has an austenitic structure (306) and the torque tube is in an untwisted state (forming untwisted tube (318)). In one or more embodiments, the heating uses induction heating via a magnet wire and a high frequency, high current amplifier.

Block 1004 represents cooling the torque tube (318) so that the SMA transforms into a martensitic structure or phase (308). In one embodiment, the cooling is air cooling, e.g., using pressurized air.

Block 1006 represents twisting the torque tube (318) comprising the SMA having the martensitic structure, so as to form a twisted torque tube (320).

Block 1008 represents heating the twisted torque tube (320) so that the twisted torque tube untwists to the untwisted state (forming untwisted tube (318)). Steps (1000)-(1006) may be repeated as desired until the desired torque output (208a) is achieved, so as to form torque tubes (202a), (202b).

In one or more embodiments, the torque tube (202a), (202b) after the thermomechanical treatment of steps (1000)-(1006) is further characterized by an actuation modulus of 1.1 MPSI in the austenite phase (306) and 1.8 MPSI in the martensitic phase (308), as well as a two way shape memory effect (SME) of 3.6% (the material remembers its austenite shape. and with 2 way SME training, thermomechanical processing creates the "memory" of the stable martensite shape). Higher torque at a higher temperature is typically achieved using the NiTiHf torque tube as compared to a the torque tube consisting essentially of NiTi. The temperature range at which NiTi changes shape is between 50° C.-110° C. whereas the temperature range at which the NiTiHf changes shape depends on stoichiometry (NiTiHf with 20% Hf is changes shape at 125° C.-200° C.

In one or more embodiments, the untwisting of the torque tubes (202a), (202b) outputs torque (208a), (208b) capable of turning (606) a rotor shaft (122) so as to reduce or prevent thermal bowing (B) of the rotor shaft (122) in a temperature gradient (T). In yet further embodiments, the SMA comprises a composition and the torque tubes (202b), (202a) have dimensions, such that the torque tube (202a), (202b) outputs at least 200 inch pounds of torque (208a), (208b) in response to the torque tube (202a), (202b) changing in temperature by 300 degrees when heat (218) is applied.

In various examples, a 0.325" OD torque tube (202a) generates over 200 in-lbs of torque, a 2" OD torque tube (202a) generates over 35,000 in-lbs of torque, and a 1.5" OD torque tube (202a) generates 15,000 in-lbs of torque, and a 0.1" OD torque tube (202a) tube generates 15 in lbs torque.

Block 1010 represents attaching means (222) for preventing the relaxing torque tube (202a) (202b) from applying torque in the incorrect direction (e.g., when cooling (312) or heating (218)). In one or more examples, the means (222) comprises a ratcheting mechanism (212) attached to the torque tube as illustrated in FIGS. 2 and 4E. The ratcheting mechanism (212) allows continuous twist of the torque tube (202a), (202b) in one direction (210).

Block 1012 represents connecting a plurality (e.g., a pair) of the torque tubes (202a), (202b). In one or more embodiments, the connection (224) or means for connecting the torque tubes (202a), (202b) comprises a gear system (206) including e.g., sprag gears (206b)) cooperatively connecting the ends (226) of one or more of the torque tubes (202a), (202b). Various gearing ratios may be used for the gearing (206). In one embodiment, the output (208c) from the gearing (206) is geared at a 5:1 ratio.

Block 1014 represents housing the torque tubes and gear system in a housing (228), such as a line replaceable unit (LRU) system. In one or more embodiments, the housing (228) has a length (L) of 10.5 inches, a width (W) of 6 inches, and a height (H) of 4 inches.

Block 1016 represents the end result, an SMA turning motor (200). In one or more embodiments, the power requirement for heating each torque tube (202a), (202b) is 400 Watts for a half cycle and the motor (200) outputs 200 inch pounds of torque (208c) at 1 revolution per minute (RPM). In one example, the motor (200) has a weight of 2 lbs.

As a comparison, conventional engine turning motors weigh 25 lbs and output only 66 inch pounds of torque, and gearbox torque generators weigh 16 lbs and output 190 inch pounds of torque. Thus, SMA motors according to embodiments of the present invention output surprisingly and unexpectedly higher torque outputs while having the advantage of significantly lower weight. These properties are particularly advantageous for aircraft applications. These unique actuation capabilities of the SMA motor enable new capabilities and applications.

Moreover, the combination of SMA with ratcheting gears (212) overcomes any problems that may arise due to slow actuation of a single torque tube. In a paired scheme, continuous torque is provided (one tube relaxes/cools while the other tube is in use providing torque).

Processing Environment

Figure 11:
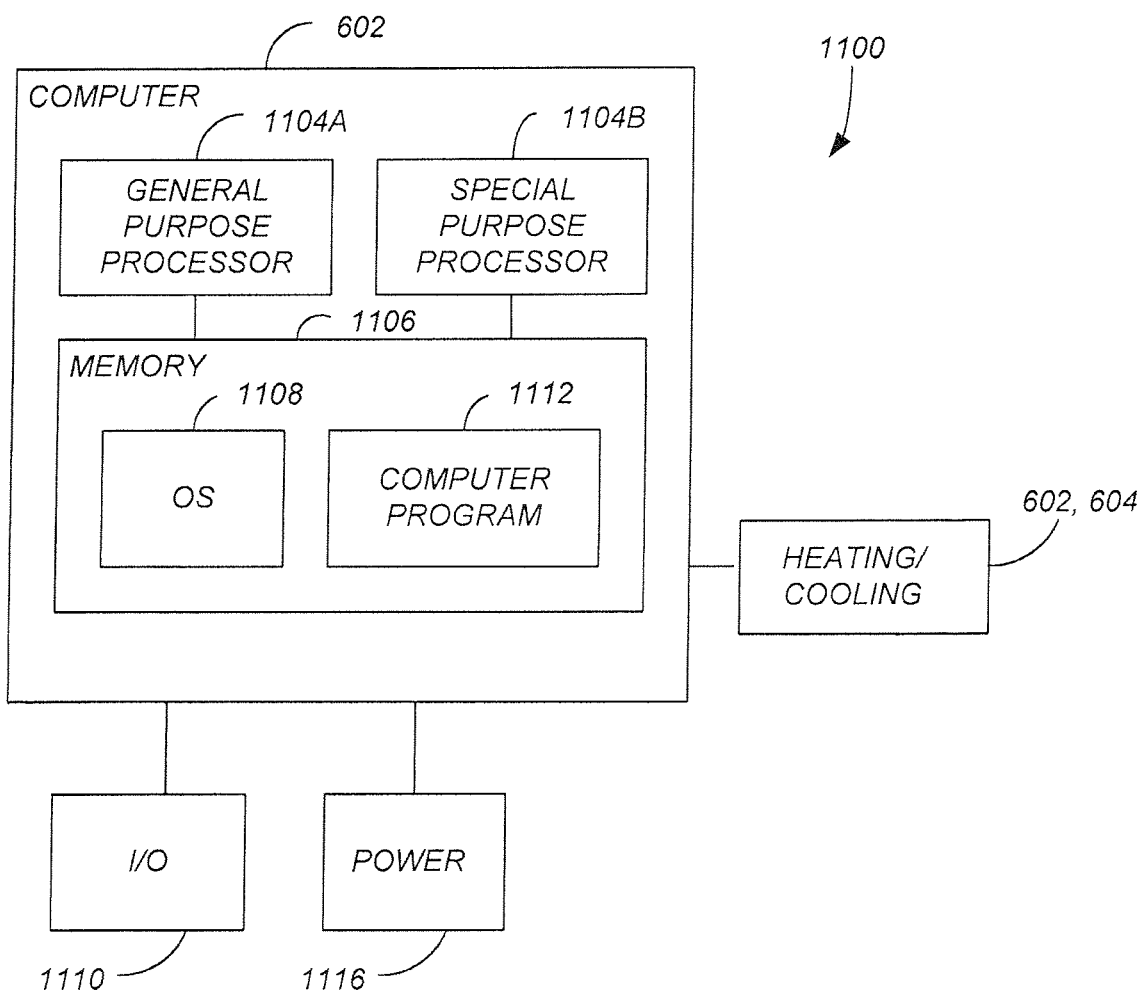
FIG. 11 illustrates an exemplary hardware environment for activating the SMA motor.

FIG. 11 illustrates an exemplary system 1100 that could be used to implement processing elements needed to activate the heater (602) and/or cooler (604) so as to sequentially heat (218) and cool (312) the torque tubes (202a, 202b) as described herein. The computer system is typically located on the aircraft e.g., but not limited to, in a box mounted on the engine fan case or inside the aircraft.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110.

The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1110 are tangibly embodied in the memory 1106, thereby making a computer program product or article of manufacture. As such, the terms "article of manufacture," "program storage device" and "computer program product" as used herein are intended to encompass a computer program accessible from any computer readable device or media.

In one embodiment, computer 1102 comprises one or more field programmable gate arrays (FPGAs).

In one embodiment, an Electronic Engine Control (EEC) sending a digital request to the computer 1102 through I/O 1110 to activate/de-activate the heater (602) or cooler (604) in order to rotate the rotor shaft (122), thus controlling HP compressor 108 speeds.

In one embodiment, the I/O 1110 receives signal from an engine shut off switch after engine 200 shut down, thereby activating the motor (200) to turn the rotor soon/immediately after engine shut down so as to minimize aircraft departure delays caused by mitigating rotor shaft bow.

In another embodiment, the duration of rotation (606) is optimized by having the computer 1102 estimate the amount of bow (based on time since last engine shutdown) and calculate the required rotation duration to be implemented. Various instrumentation to monitor the bowing can include accelerometers already used for vibration monitoring or microwave-based gap measuring sensors.

FIG. 11 further illustrates a power source 1116 for providing power to the system 1100.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A motor, comprising:
a plurality of cooperatively connected torque tubes each comprising a shape memory alloy (SMA), wherein:
the cooperatively connected torque tubes generate a continuous torque output when the torque tubes, sequentially change shape in response to heat, and
the shape memory alloy comprises a composition and the torque tubes have dimensions such that the torque tubes output at least 200 inch pounds of torque in response to the SMA changing temperature of 300 degrees Celsius.

2. The motor of claim 1, wherein the shape memory alloy comprises Nickel and Titanium.

3. The motor of claim 1, wherein the shape memory alloy comprises an alloy including at least two metals selected from nickel, titanium, zinc, copper, gold, palladium, platinum, and iron.

4. The motor of claim 1, wherein the SMA consists essentially of NiTiHf having an Hf content in a range of 10%-30%.

5. The motor of claim 1, wherein the torque tubes each have a length in a range of 5-50 inches and a diameter in a range of 0.1-2 inches.

6. The motor of claim 1, wherein:
the cooperatively connected torque tubes comprise a pair of the torque tubes connected to gearing,
the gearing transfers torque from each of the torque tubes sequentially so as to generate the continuous torque output, and
the torque from each of the torque tubes is in a same direction.

7. The motor of claim 6, further comprising a heater coupled to each of the torque tubes, wherein each of the torque tubes change their shape by untwisting in response to the heat applied by the heater that transforms the SMA into an austenitic phase.

8. The motor of claim 7, wherein the heater comprises a coil of wire about one end of each of the torque tubes, so as to provide the heat through induction when a current is passed through the wire.

9. The motor of claim 7, further comprising:
an output shaft connected to the gearing; and
a controller activating the heater so as to sequentially heat the torque tubes, wherein:
the gearing transfers the torque from one of the torque tubes to the output shaft when the other of the torque tubes is cooling; and
the torque from each of torque tubes turns the output shaft in the same direction.

10. The motor of claim 9, further comprising a cooling system coupled to each of the torque tubes, wherein the torque tube that is cooling twists in response to a cooling from the cooling system that transforms the shape memory alloy into a martensitic phase.

11. The motor of claim 9, further comprising a ratcheting mechanism connected to an end of each of the torque tubes so that each of the torque tubes untwist continuously in a first direction in response to the heat.

12. A motor, comprising:
a plurality of cooperatively connected torque tubes each comprising a shape memory alloy, wherein:
the cooperatively connect torque tubes generate a torque output when the torque tubes change shape in response to heat,
the torque tubes are each trained to output torque capable of turning a rotor shaft so as to reduce or prevent thermal bowing of the rotor shaft in a temperature gradient, and
the rotor shaft is the rotor shaft of a gas turbine engine.

13. The motor of claim 12, wherein:
the rotor shaft has a longitudinal axis and is disposed inside a casing;
the casing comprises trapped air creating the temperature gradient perpendicular to the longitudinal axis; and
the torque turns the rotor shaft about the longitudinal axis.

14. The motor of claim 12, wherein the rotor shaft is the rotor shaft in an aircraft gas turbine engine.

15. The motor of claim 12, wherein the motor is attached to an aircraft engine gearbox.

16. A torque tube, comprising:
a shape memory alloy, wherein the torque tube is trained to output torque capable of turning a rotor shaft so as to reduce or prevent thermal bowing of the rotor shaft in a temperature gradient, wherein the roto shaft is the roto shaft of a gas turbine engine.

17. The torque tube of claim 16, wherein the SMA consists essentially of NiTiHf having an Hf content in a range of 10%-30% and the torque tube has a length (L) in a range of 5-50 inches and a diameter in a range of 0.1-2 inches.

18. A motor, comprising:
a pair of torque tubes each comprising a shape memory alloy, wherein the torque tubes are each trained to output torque when the shape memory alloy is heated into an austenitic phase;
a ratcheting mechanism connected to each of the torque tubes (202*a*),(202*b*) and allowing untwisting of the torque tubes in a first direction; and
gearing connected to the torque tubes, wherein:
the gearing outputs the torque from each torque tube to an output shaft,
the torque from each of the torque tubes is in a same direction; and
a transmission coupled to the output shaft, wherein the transmission turns a rotor shaft in a gas turbine engine when the gearing outputs the torque to output shaft.

19. The motor of claim 18, wherein the torque tubes are each trained to output the torque capable of turning the rotor shaft so as to reduce or prevent thermal bowing of the rotor shaft in a temperature gradient.

* * * * *